United States Patent
Trudeau et al.

(10) Patent No.: US 7,126,458 B2
(45) Date of Patent: Oct. 24, 2006

(54) SLIDING AXLE ALARM

(75) Inventors: Curtis A. Trudeau, Caledonia, MI (US); Gary L. Schafer, Shelbyville, MI (US); Robert D. Sorum, deceased, late of Caledonia, MI (US); by Loralye Sorum, legal representative, Sioux City, IA (US); Dick E. Winter, Kentwood, MI (US)

(73) Assignee: Hadley Products, Grandville, MI (US)

( * ) Notice: Subject to any disclaimer, the term of this patent is extended or adjusted under 35 U.S.C. 154(b) by 273 days.

(21) Appl. No.: 10/893,453

(22) Filed: Jul. 16, 2004

(65) Prior Publication Data

US 2006/0012136 A1   Jan. 19, 2006

(51) Int. Cl.
G08B 21/00 (2006.01)

(52) U.S. Cl. ............... 340/431; 340/426.32; 340/679; 70/174; 70/226; 303/191; 303/198

(58) Field of Classification Search ............... 340/431, 340/438, 440, 603, 612, 679, 682, 426.32; 70/174, 226; 200/61.25; 303/191, 198
See application file for complete search history.

(56) References Cited

U.S. PATENT DOCUMENTS

| | | | |
|---|---|---|---|
| 5,161,579 A | * | 11/1992 | Anderson, Jr. ............ 137/627.5 |
| 5,232,234 A | | 8/1993 | McCombs |
| 5,314,201 A | * | 5/1994 | Wessels .................. 280/407.1 |
| 5,451,069 A | | 9/1995 | Schueman |
| 5,716,071 A | | 2/1998 | Stanley et al. |
| 6,384,716 B1 | | 5/2002 | Eckelberry |

* cited by examiner

Primary Examiner—Thomas Mullen
Assistant Examiner—Daniel Previl
(74) Attorney, Agent, or Firm—Warner Norcross & Judd LLP

(57) ABSTRACT

An alarm system that indicates to an operator the status of locking pins of a vehicle sliding axle assembly. The alarm system includes an alarm valve coupled to the locking pins and in fluid communication with an alarm. When the pins are unlocked from a vehicle component, the alarm valve is configured in an alarm mode to indicate the unsecured condition of the assembly. In this mode, air is diverted from the vehicle brakes to sound the alarm, thereby informing an operator that the pins are improperly engaged. In one embodiment, the alarm valve is in communication with or includes a pressure relief valve, which diverts a sufficient amount of air from the vehicle brakes so that the brakes cannot be released. When the pins are properly locked to secure the slider axle assembly, the alarm valve does not divert air from the brakes to sound the alarm.

24 Claims, 12 Drawing Sheets

SLIDING AXLE ALARM

BACKGROUND OF THE INVENTION

The present invention relates to trailers equipped with sliding axles, and more particularly to an alarm for indicating the status of a sliding axle system.

Many trailers are equipped with a system that enables the axles of the trailers to be moved relative to a load-bearing frame of the trailer. Such a system is often referred to as a "sliding axle" system. With this system, an operator can adjust the position of the axles relative to the trailer frame, and thereby alter the trailer's cornering ability, or redistribute a trailer load relative to the trailer axles and/or a truck to which the trailer is secured.

A sliding axle system typically includes an assembly secured to the suspension units, which are further secured to the axles of the trailer. The assembly slidingly engages the frame of the trailer or a track welded to the frame. Specifically, the assembly includes a set of pins, actuated by a handle, that retract from and extend into holes defined in the frame or track to lock the assembly in fixed position relative to the frame. In operation, an operator actuates the brakes of the sliding axle assembly, pulls the handle to extract the pins from the holes, thereby enabling the sliding axle assembly to slide relative to the frame and/or track. With the pins pulled, the operator drives the trailer forward or rearward using the tractor until the sliding axle assembly is in a desired position. After the assembly is moved, the handle is re-actuated to lock the pins in the holes and thereby secure the suspension unit in fixed relation to the trailer.

Some problems with sliding axle systems is that the pins may vibrate loose, or after adjustment, an operator may fail to properly lock the pins in the frame holes. Accordingly, as the trailer travels, the sliding axle assembly is free to move forward and rearward relative to the frame. This presents a dangerous situation if the trailer brakes are applied or if the trailer is pulled at excessive speeds.

One attempt to solve these problems is embodied in an electrical system which detects when the pins are not locked in the frame holes. U.S. Pat. No. 5,451,069 to Schueman discloses such a system, wherein an electrical microswitch illuminates a light when the locking pins are fully retracted and the air brakes are applied. Although this system provides a way to inform an operator that the sliding axle pins are not locked, it suffers a number of shortcomings. First, the electrical system must be coupled to the power supply or electrical system of the truck. This requirement takes a significant amount of time and care to ensure that the proper voltage is provided to the system. Second, the electrical switches of such an electrical system can easily short if not properly protected from the environment. Third, it is difficult for an operator to detect if the system is properly operating unless the operator inspects the pins.

SUMMARY OF THE INVENTION

The aforementioned problems are overcome in the present invention which provides a sliding axle alarm system, in communication with a vehicle air system, that sounds an audible alarm with air exhausted from the air system when a sliding axle is not properly locked. In one embodiment, the audible alarm is an air horn.

In a specific embodiment, the sliding axle alarm system includes a valve assembly that is a) in communication with a pin mechanism, which is used to engage and disengage locking pins of a sliding axle assembly from a vehicle frame or other component, and b) in communication with the air system of a vehicle used to release its mechanical brakes. When the pin mechanism disengages the pins from the frame or other vehicle component, and thus unlocks the sliding axle, the valve assembly is configured in an alarm mode. In the alarm mode, when an operator releases the parking brake, the valve assembly diverts air from the mechanical brake air system, for example, the parking brake system, the trailer air supply, and/or the truck air supply, subsequently sounding the audible alarm with the diverted air. When the pin mechanism sufficiently engages the pins with the frame, the valve assembly is configured in a rest mode, which enables the parking brake air system to release the parking brake when actuated by an operator without sounding the alarm.

In another embodiment, the valve assembly includes a pressure relief valve. The pressure relief valve enables enough air to be diverted from the parking brake air system in the alarm mode to prevent the parking brake air system from pressurizing, and thereby prevent the release of the mechanical parking brake.

In yet another embodiment, the valve assembly includes an exhaust port to enable air to be rapidly diverted from the parking brake air system in the alarm mode.

In a further embodiment, the valve assembly is in communication with a truck air supply system and configured so that when the valve is placed in an alarm mode by disengaging the locking pins, the audible alarm sounds with air from the truck air supply.

The sliding axle alarm system of the present invention offers many benefits, a few examples of which follow. First, this system is plumbed into the parking brake air system, rather than the operating air brake system. Thus, the operating air brake system remains unmodified, thereby maintaining the integrity of that system. Second, the sliding axle alarm system is operated by the parking air brake system—it is unnecessary to connect the system to a vehicle's electrical system unless desired. This makes the system easy to install and maintain. Third, the system provides an audible alarm to inform a user that the axle pins are not properly set, while optionally providing an additional safety feature by preventing the parking brake from being released.

These and other objects advantages and features of the invention will be more readily understood and appreciated by reference to the detailed description of the invention and the drawings.

DETAILED DESCRIPTION OF THE INVENTION

I. Overview

Figure 1:
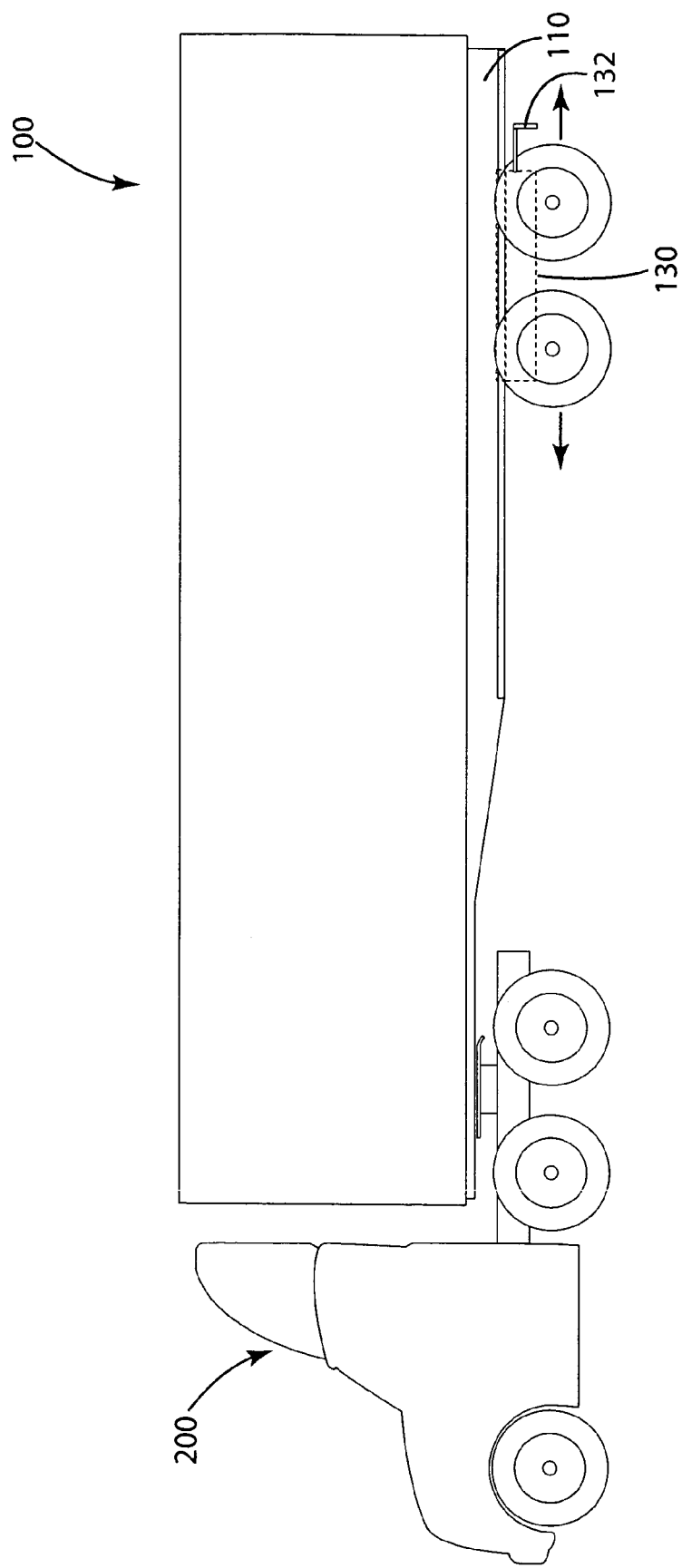
FIG. 1 is a side elevational view of a truck and trailer combination equipped with the sliding axle alarm of the present invention.

A sliding axle assembly alarm constructed in accordance with one embodiment of the invention is illustrated in FIGS. 2–6 and generally designated 10. The alarm 10 generally includes an alarm valve 20 in fluid communication with an alarm 80, which is shown as an air horn. The alarm valve is further mechanically connected to a torque tube 142 of a sliding axle assembly 130 so that when the tube is adjusted to engage or disengage the slider assembly pins 144, the valve is actuated to a rest mode and/or an alarm mode. The alarm valve 20 is in further fluid communication with a brake valve 72, which provides fluid communication between an air supply 70 and the mechanical parking brakes 152 and 154 of the trailer 100.

In operation, when the slider pins 144 are engaged with or locked in slider pin holes 145, the alarm valve 20 is in a rest mode (FIG. 5), so that air may be transferred from brake air supply 70 to the brake lines 74 and 76 and subsequently unlock the mechanical parking brakes 152 and 154 so the trailer can be moved. However, if the pins are disengaged or unlocked from the pin holes 145, and the mechanical parking brakes 152 and 154 are pressurized with the transfer of air to the brake valve 72, the alarm valve remains open, which allows pressurized brake air to vent through the alarm valve 20 and sound the horn 80 as an alarm.

II. Construction

The sliding axle alarm system 10 of the present invention, also referred to as a locking pin alarm system, is well suited for a trailer 100 that is pulled by a truck or tractor 200, as shown in FIG. 1. The trailer 100 includes a frame 110 and a sliding axle assembly 130, which may be moved by an operator in the direction of the arrows as shown to provide tight cornering ability or to redistribute the load relative to the truck 200. The handle 132 is used by the operator to adjust positioning of the assembly 130 as further described below. It is noted that although the locking pin alarm system of the present invention is described in connection with a sliding axle assembly of a semi-tractor trailer, it may be used in connection with any type of sliding axle assembly used with any vehicle, for example, a trailer, a tractor, a truck, or an automobile.

Figure 2:
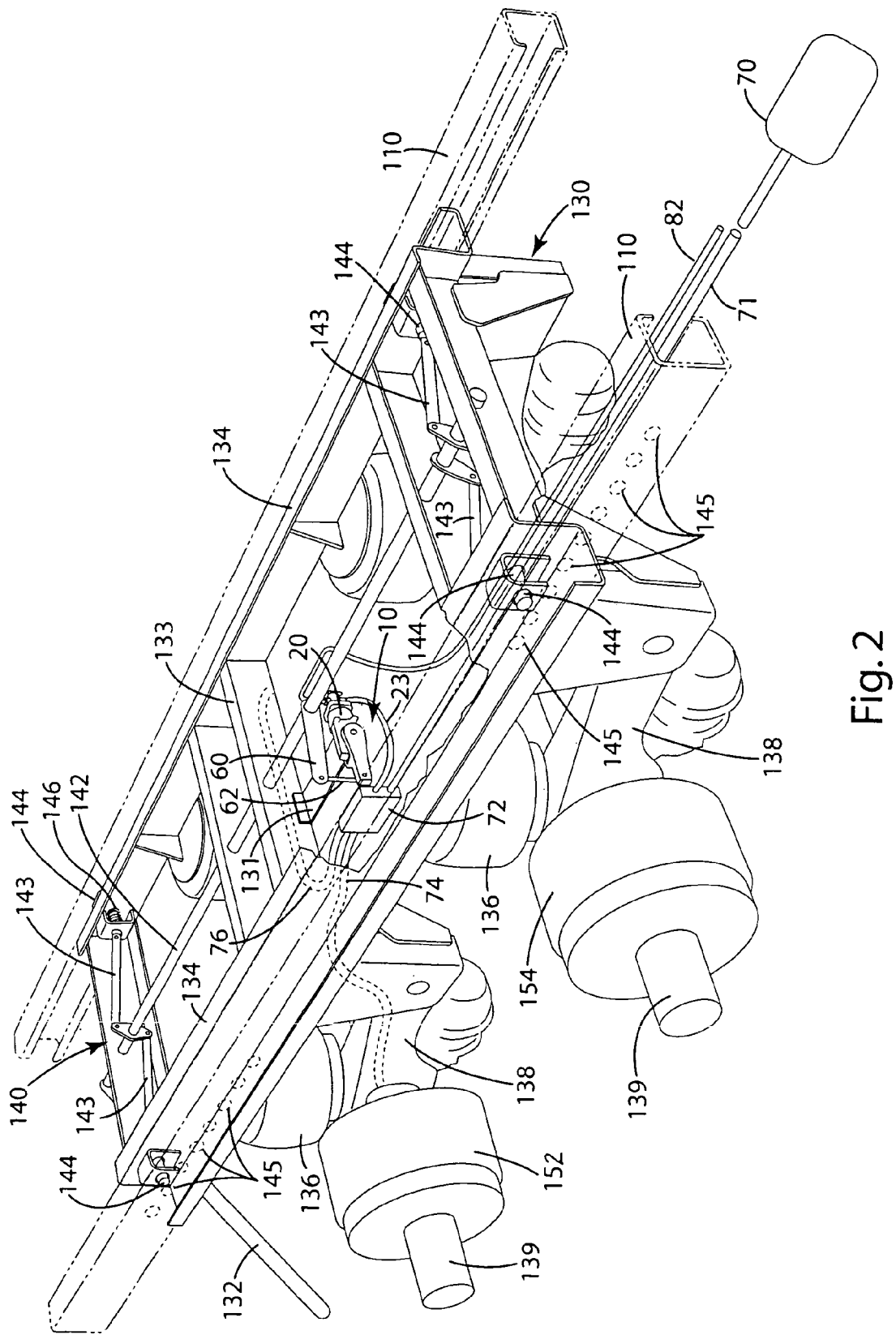
FIG. 2 is a perspective view of the sliding axle alarm connected to a sliding axle assembly.

One type of sliding axle assembly 130 with which the locking pin alarm system 10 may be used with is shown in FIG. 2. It is noted that the locking pin alarm system 10 may be used with any alternative sliding axle assembly as desired. The assembly 130 generally includes side rails 134 which are slidingly nested with frame rails 110 of the trailer 100. Support arms 138 are secured to the side rails 134. The suspension units 136 and axles 139 are further secured to the support arms 138. The suspension units 136 provide suspension between the axles 139 and the side rails 134. Brakes 152 and 154 are secured to the axles 139. The brakes may be outfitted with a mechanical parking brake or spring brake, which is set by an operator when parking the trailer 100 for a period. To release the brakes, the operator activates the air supply 70 with a control (not shown) so that air is transferred to the brake valve 72 via the supply line 71. From the brake valve, this air is transferred to the brake lines 74 and 76 to a conventional mechanical brake release within the brakes 152 and 154 to release the mechanical parking brakes. It is noted that multiple brake lines may be associated with the brake valve 72 and further connected to other brakes on the slider assembly, and/or other portions of the vehicle. It is further noted that with the mechanical parking brakes released, the trailer may be moved as desired. Further, the lines used with the present invention may be any type of tubing or other convenient material or other structure capable of providing fluid communication between two points.

As shown in FIG. 2, the slider assembly 130 includes a pin mechanism 140, which includes a torque tube 142 mechanically connected to linkages 143, which are further mechanically coupled to locking pins 144. A handle 132 is further secured to the torque tube 142. The handle may be removable from the torque tube to prevent unauthorized tampering with the tube. The torque tube may also be connected to an automatic slider pin actuator that rotates the torque tube without an operator having to manually do so (not shown). Such automatic torque tube actuators are typically pneumatically or electrically actuated. The pin mechanism further includes locking pin springs 146 that urge the locking pins 144 to a locking or engaged configuration in which the pins 144 are received in the holes 145 defined by the frame 110 when the pins are properly aligned with those holes. It is noted that a variety of alternative pin mechanisms are implemented in different sliding axle assemblies. The sliding axle alarm system of the present invention may be used in connection with these other systems while using similar constructions and principles of operation.

Figure 5:
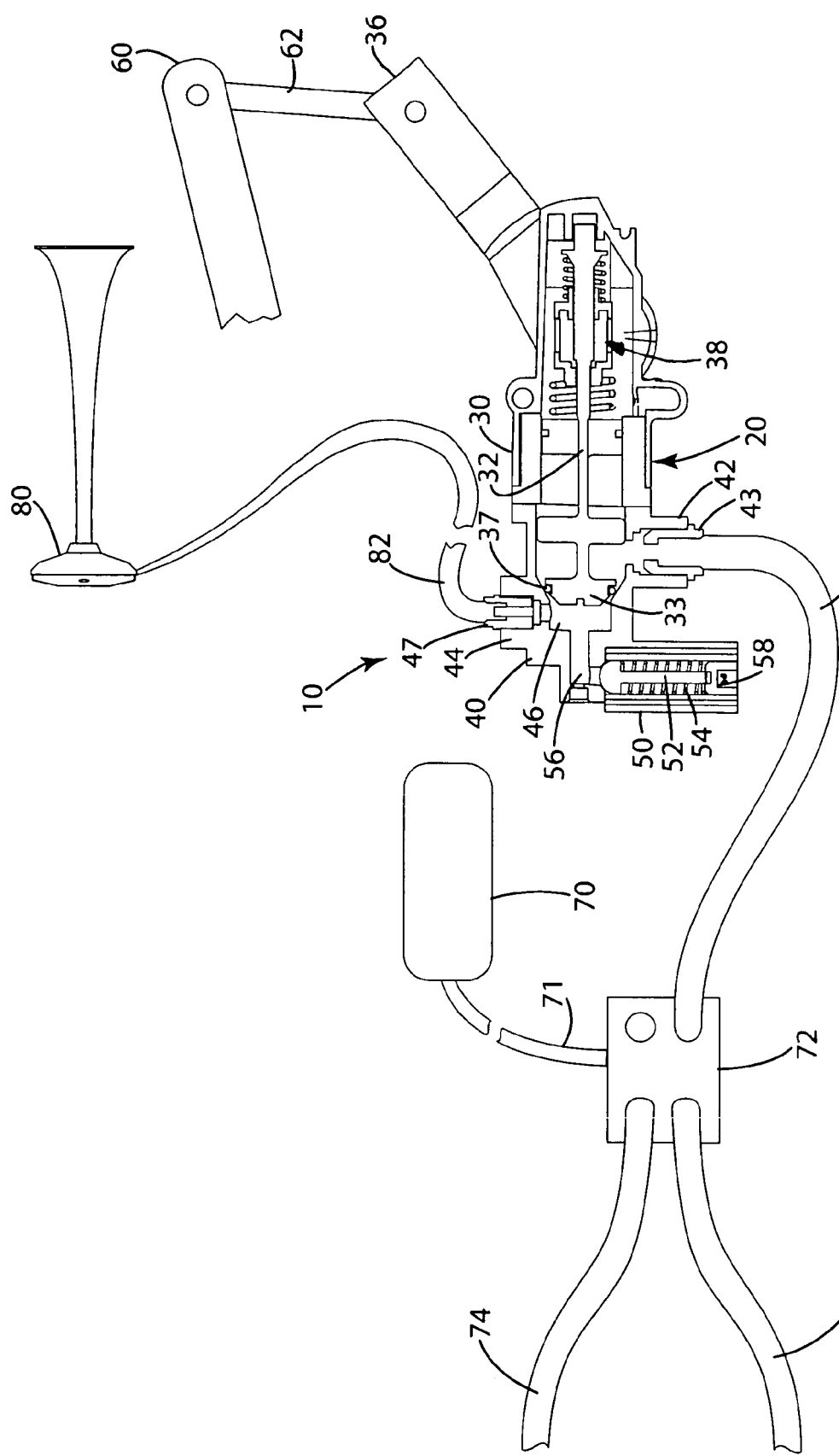
FIG. 5 is a schematic of the sliding axle alarm in a rest mode.
Figure 6:
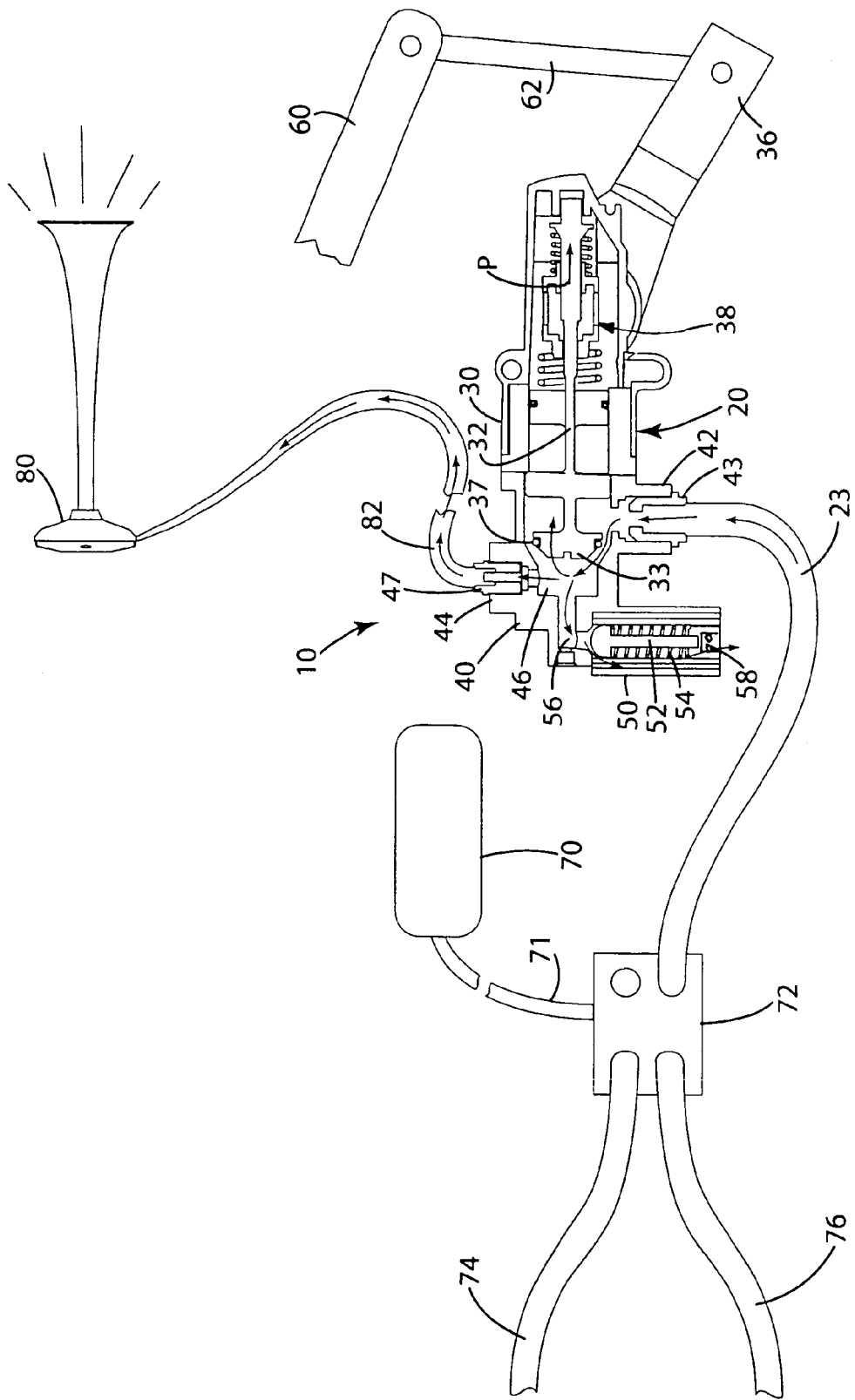
FIG. 6 is a schematic of the sliding axle alarm in an alarm mode.

The alarm valve 20 of the alarm system 10 will now be described. Generally, the alarm valve 20 may include mounting holes, flanges and/or other structures that enable the valve 20 to be fixedly secured to a component of the vehicle, for example, the sliding axle assembly. As shown in FIG. 2, the valve 20 is secured to a bracket 131 mounted to a cross member piece 133 of the sliding axle assembly. The alarm valve shown in FIGS. 2 and 5–6, is also in fluid communication with the brake valve 72 via air line 23. The alarm valve 20 generally includes a valve actuator 30 and a valve body 40.

The actuator 30 includes an arm or a lever 36 which is linked with a connecting rod 62 to a torque tube crank 60. The torque tube crank 60 is fixedly mounted to torque tube 142 so that upon rotation of the torque tube with a handle 132, the crank 60 also moves. Accordingly, the actuator arm 36 also moves to operate the actuator 30 and thus the alarm valve 20, as described in further detail below. It will be noted that although the alarm valve 20 is shown as being mounted transversely to the sliding axle assembly, in other configurations, for example, where the torque tube 142 is transverse to the sliding axle assembly, the alarm valve 20 may be configured parallel to the sliding axle assembly 130.

Figure 3:
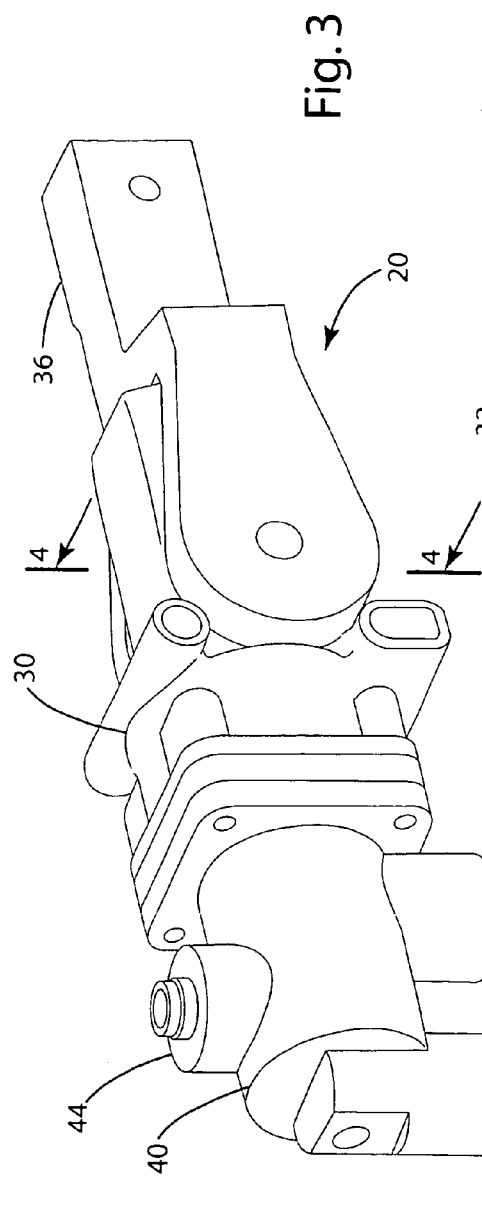
FIG. 3 is a perspective view of an alarm valve of the sliding axle alarm.
Figure 4:
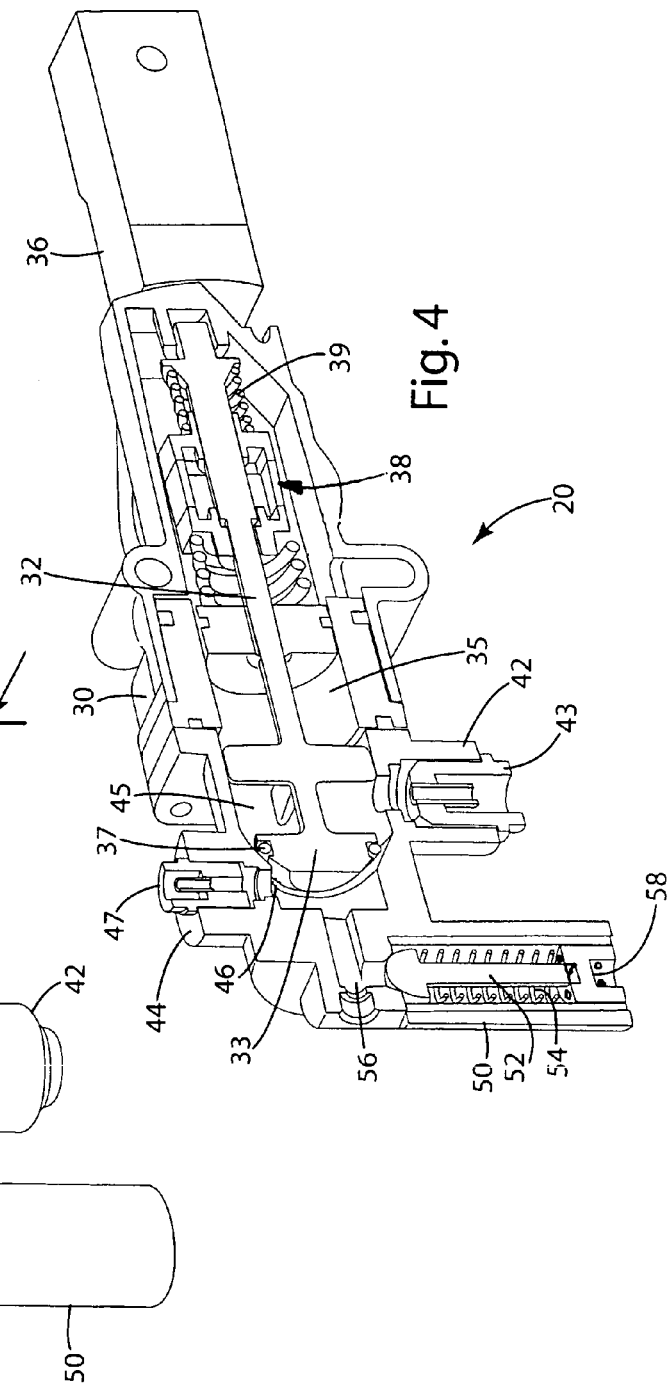
FIG. 4 is a sectional view of the alarm valve taken along lines 4—4 of FIG. 3.

Referring now to FIGS. 3 and 4, the actuator 30 is joined with the alarm valve body 40 in a conventional manner, such as with screws, bolts, welds, cement or other fasteners. As will be appreciated, the entire unit may be constructed of a single, unitary piece as desired. The actuator 30 includes an actuating mechanism 38 which is operatively coupled to the lever 36. This actuating mechanism 38 may be constructed in accordance with the actuating mechanism of the valve disclosed in U.S. Pat. No. 5,161,579 to Anderson, issued Nov. 10, 1992, which is hereby incorporated by reference. Via the actuating mechanism 38, the lever 36 also is operatively connected to the plunger 32 so that movement of the lever 36 causes the plunger 32 to move along and/or reciprocate in the longitudinal bore 35 of the actuator 30. A head 33 joined with a plunger 32 at an end of the plunger further extends into the valve body 40. The head 33 may optionally include a seal, for example, the illustrated O-ring 37, to sealingly engage the exhaust port 46 of the valve body 40 when the plunger 32 is actuated by the lever 36.

Referring further to FIGS. 3–5, the of the alarm valve body 40 defines exhaust port 46, into which the plunger head 33 at least partially extends. The valve body 40 further includes a brake port 42 which into which a fitting 43 is secured. This fitting 43 may be further secured to the air line 23 as shown to provide fluid communication between the body 40 and the brake valve 72. The brake port 42 extends to the internal bore 45 of the valve body 40, and is in communication with the exhaust port 46.

The valve body 40 also includes an alarm port 44 within which an alarm line fitting 47 is disposed. This fitting 47 may be further connected an alarm line 82 leading from the alarm port to the audible alarm 80 (shown as a horn) which is activated by air. It will be noted that the air need not directly cause the audible alarm to blow, as with a conventional horn. Instead, the air may produce a pressure at a given location so that the pressure operates to sound another type of audible alarm, for example, a pressure-sensitive audible electronic alarm. This audible electronic alarm may sound in the form of a tone, beeping, a blast or an electronic or recorded voice.

Optionally, the valve body 40 further includes a pressure relief valve 50, which is in fluid communication with the exhaust port 46, the alarm port 44 and the brake port 42. The pressure-relief valve 50 includes a relief plunger 52 that is biased with spring 54 against aperture 56. The spring 54 may be of any spring type, for example, the coil spring as shown, or a leaf or other spring. When sufficient pressure develops in the exhaust port 46 and/or aperture 56 to compress the spring 54, the plunger moves to enable air to escape through the relief port 58.

III. Operation

The operation of the sliding axle alarm system will now be described with reference to FIGS. 2 and 4–6. The alarm system 10 shown in FIG. 5 is in "rest mode." This mode corresponds to the locking pins 144 (FIG. 2) being in a satisfactorily locked configuration with regard to the locking pin holes 145. In this mode, the physical condition of the pins 144 and pin mechanisms 140 is transferred to the alarm valve 20 via the torque tube 142 being in a specific rotational position. Specifically, the rotational position of the torque tube 142 dictates the position of the torque tube lever 60. Accordingly, the torque tube lever 60 positions the actuator arm 36 of the alarm valve 20 in the configuration shown in FIG. 5.

In that configuration, the plunger 32, and thus the plunger head end 33 and the seal 37 are engaged against the exhaust port 46 so that pressurized air in the air line 23 does not flow through the brake port 42 and into the exhaust port 46. When the alarm valve 20 is in this configuration, pressurized air from the air line 23 cannot be transferred through the exhaust port to the audible alarm 80 to sound the alarm. As a result, after the operator releases the parking brake, the alarm 80 does not sound. Therefore, the operator can be confident that the locking pins are satisfactorily engaged with the locking pin holes, and that the slider assembly is satisfactorily secured to the frame of the trailer. Notably, when the alarm valve 20 is in this configuration, it will not allow pressurized air to escape through it from the brake valve 72. Accordingly, provided the parking brake system is operating properly, the air supply 70 fully pressurizes the brake lines 74 and 76 to release the mechanical parking brake associated with the respective wheels of the trailer 100. Thereafter, the trailer may be moved as desired.

The operation of the alarm valve 20 in an "alarm mode" will now be described with reference to FIGS. 2 and 6. To adjust the position of the sliding axle assembly 130 with respect to the frame 110, an operator sets the mechanical parking brakes 152, 154, also referred to as spring brakes, of the trailer via a control (not shown) which is typically located in the truck 200 to which the trailer 100 is attached (FIG. 1). The operator exits the cab of the truck 200 and secures the handle 132 to the torque tube 142. The operator rotates the handle 132 and the torque tube 142 to activate the pin mechanism 140. This movement disengages the pins 144 from the respective holes 145 in the frame 110. Additionally, when the torque tube 142 is rotated, the torque tube lever 60 moves the arm 36 of the alarm valve 20 via the connector arm 62. As shown in FIG. 6, when the arm 36 is moved, the plunger 32 and subsequently the plunger head 33 move in the direction of arrow P as shown. Accordingly, the seal 37 disengages the exhaust port 46 thereby providing fluid communication between the brake port 42 and the respective alarm port 44 and relief valve 50. The components of the alarm valve 20 remain in this configuration until the arm 36 is moved again.

With the pins 144 disengaged from the pin locking holes 145, the operator typically enters the cab of the truck 200 and drives it forward or rearward to effectively move the sliding axle assembly 130 in one or more of the directions shown in FIG. 1. After adjusting the position of the sliding axle assembly 130, the operator exits the truck and rotates the handle 132 to reset the locking pins 144 in the locking pin holes 145. In some situations, however, the operator forgets to do this, or unsatisfactorily re-engages the pins 144 with the holes 145, for example by not rotating the torque tube enough to fully actuate the pin mechanism 140.

In such a situation, the locking pin alarm system of the present invention provides a safety mechanism to inform the operator that the pins have not been properly re-engaged with or locked in the locking pin holes. Specifically, if the pins are not properly locked, the alarm system 10 is configured in an alarm mode, as shown in FIG. 6. In this mode, when the operator attempts to release the mechanical parking brakes by pressurizing the mechanical brake release lines 74 and 76 with the air supply 70, the supplied, pressurized air is diverted via the air line 23 to the alarm valve 20. The alarm valve 20 allows the pressurized air to enter the exhaust port 46 and exit through the alarm port 44, travel through the alarm line 82, and sound the alarm 80 as depicted. The direction of travel of the air vented from the brake valve 72 through the alarm valve 20 and to the alarm 80 is shown in FIG. 6 with arrows. This audible sounding of the alarm informs the operator that the locking pins are not properly engaged with the frame and thus the trailer should not be moved because the slider assembly 130 is not secured. After the operator is informed of the unsecured sliding axle assembly, they can take appropriate action to properly lock the locking pins.

When the pressure-relief valve 50 is included in the alarm valve 20, a portion of the air diverted from the mechanical brake release lines 74 and 76 builds enough pressure in the exhaust port 46 to overcome the biasing force provided by the spring 54 against the plunger 52. In turn, this moves the plunger and allows the air to bypass through the relief valve, the relief valve port 58 and to the atmosphere. In so doing, the alarm system 10 provides an added safety feature, that is, it relieves a sufficient amount of air pressure through the relief valve to prevent a significant amount of air pressure from building up in the release lines 74 and 76. Accordingly, enough air is diverted from the mechanical brake release lines 74 and 76 so that the pressurized air does not release the mechanical parking brake. Thus, in addition sounding an alarm, the operator cannot move the trailer 100 because the parking brakes remain locked.

IV. First Alternative Embodiment

Figure 7:
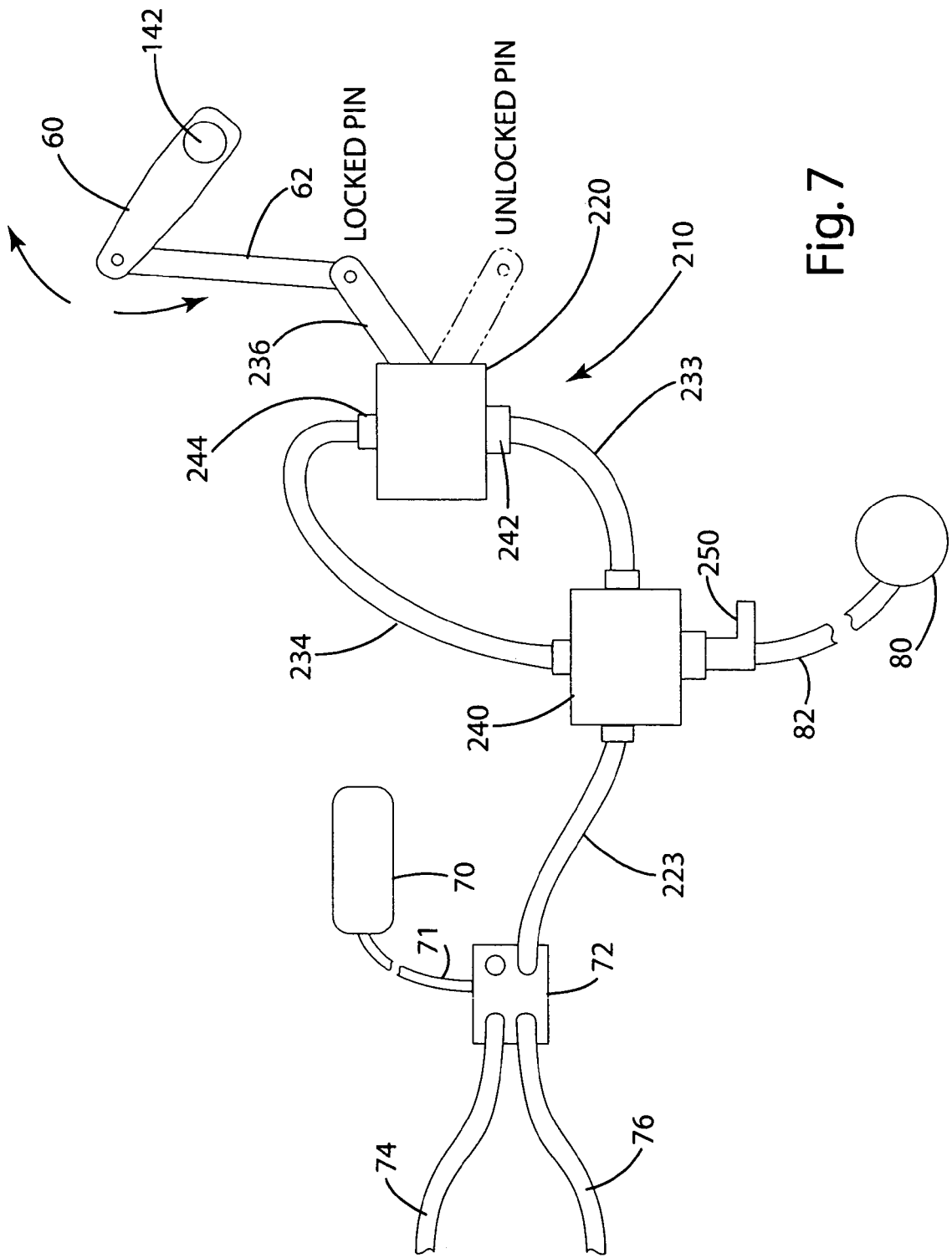
FIG. 7 is a first alternative embodiment of the sliding axle alarm system.

A first alternative embodiment of the locking pin alarm system of the present invention is shown in FIG. 7 and generally designated 210. The system 210 operates under the same principles as that of the embodiment described above. The system is connected via an air line 223 to the brake valve 72, which is further connected to the brake release lines 74 and 76, and the air supply 70 as described above. The alarm system 210 also includes alarm line 82 and alarm 80.

The alternative system 210 further includes an alarm valve 220 having a lever 236 secured with the connecting arm 62 to the torque tube lever 60, and subsequently the torque tube 142. An acceptable alarm valve 220 is a Model 600 Hadley ride height leveling valve, available from Hadley Products of Grandville, Mich. This particular valve includes a supply port 242, also referred to as a brake port, and a suspension port 244, also referred to as an alarm port or horn port. The brake port 242 is in fluid communication with the release valve 240 via the secondary air line 233. The release valve may be a standard truck industry quick release valve. The alarm port 244 is also in communication with the release valve 240 via the secondary alarm line 234. To the release valve 40 may also optionally be secured a pressure-relief valve 250, which is similar to that described in connection with the embodiment above.

The operation of the alternative locking pin sliding axle alarm 210 will now be described with reference to FIGS. 2 and 7. In general, the alarm system 210 performs the same function as the alarm system 10 described above. When the torque tube 142 is rotated and properly locks the pins 144 with the locking pin holes 145 as shown in FIG. 2, the arm 236 attains the "locked pin" configuration shown in FIG. 7. In this configuration, the alarm system 210 is in its rest mode. Accordingly, when the operator releases the mechanical parking brake by pressurizing the brake release line 74 and 76 via the valve 72 and air supply 70, the alarm system 210 permits the brakes to release. In particular, when the brake release lines 74 and 76 are pressurized via the valve 72, so too is the primary air line 223. Pressure in the primary air line 223 is transferred to the release valve 240, and subsequently to the secondary air line 233, and to the brake port 242. The alarm valve 220 permits the air, and subsequently the pressure created thereby, to travel through the valve 220 to the alarm port 244, the secondary alarm line 234 and back to the release valve 240. Accordingly, the release valve 240 achieves a pressure equilibrium within it so that air is not vented to the primary alarm line 82 to sound the alarm 80, or the pressure-relief valve 250 when included. Accordingly, the alarm system 210 does not sound the audible alarm. Furthermore, because the alarm system 210 does not allow pressure to be vented from the brake valve 72, it enables enough pressure to build in the brake release lines 74 and 76 to release the mechanical parking brakes.

The alarm system 210 will also attain and operate in an alarm mode when an operator fails to properly engage the locking pins with the locking pin holes of the sliding axle assembly as discussed above. In the alarm mode, the lever 236 of the alarm valve 220 is in the "unlocked pin" configuration shown in broken lines in FIG. 7. In this configuration, when pressurized air is supplied from the air supply 70 to the brake valve 72, a portion of that air is diverted through the primary brake line 223 through the quick release valve 240, to the brake port 242. However, because the valve 220 is in an exhaust configuration, i.e., it is in the alarm mode, the alarm valve 220 prevents the air from being expelled through the alarm port 244 and the secondary alarm line 234, back to the release valve 240. Accordingly, the release valve fails to establish a pressure equilibrium within it, and therefore the air diverted from the brake valve 72 vents through the primary alarm line 82 to the audible alarm 80. Subsequently, the audible alarm 80, e.g., an air horn, is sounded to inform the user that the locking pins are not properly engaged. Having been informed of the status of the locking pins by the alarm system 210, the operator may then reset the alarm system 210 by locking the pins and re-establishing the alarm system in the locked pin mode, i.e., rest mode, as desired.

When the relief valve 250 is included in the alarm system 210, it allows a sufficient amount of air to be vented from the valve 72 and/or brake lines 74 and 76 so that the pressure supplied through the brake release lines 74 and 76 is insufficient to release the mechanical parking brakes.

V. Second Alternative Embodiment

Figure 8:
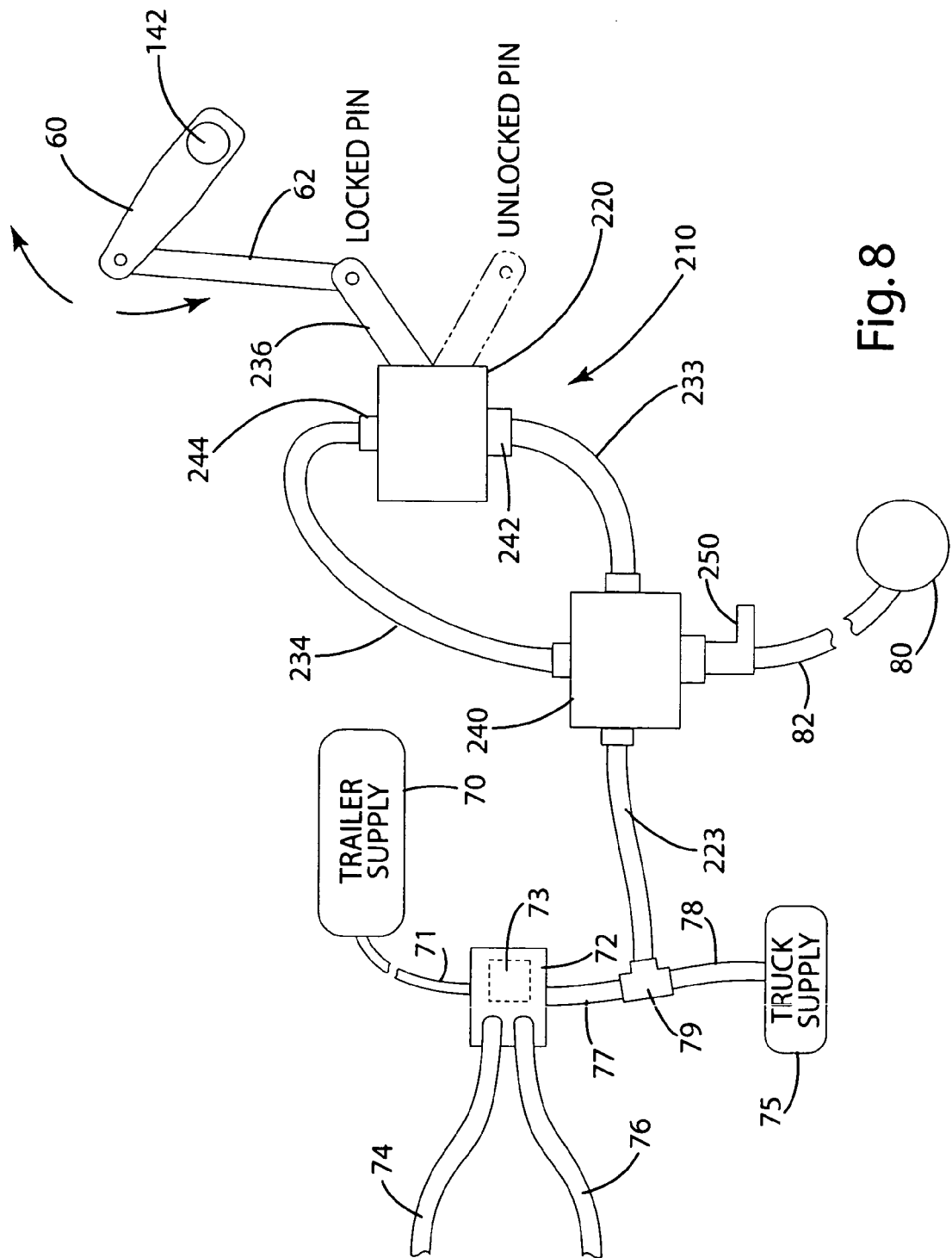
FIG. 8 is a second alternative embodiment of the sliding axle alarm system.

A second alternative embodiment of the locking pin alarm system of the present invention is shown in FIG. 8, and is similar to the first alternative embodiment. Two primary differences are that a conventional quick-release valve 73 is included in the brake valve 72; and a truck air supply 75 is in fluid communication with the system 210 and brake valve 72 (in addition to the trailer air supply 70).

Specifically, truck air supply 75 is connected to fitting 79 via truck air supply line 78. The primary brake line 223, the spring brake valve connecting line 77 and the release valve 240 are also in communication with the fitting 79.

In operation, when the locking pins are properly engaged as shown in the "locked pin" configuration of FIG. 8, the release valve 240 is in equilibrium as described above in connection with the first alternative embodiment. Likewise, the quick-release valve 73 within the brake valve 72 is also in equilibrium due to the truck air supply 75 providing air pressure in the valve 73. Accordingly, the system 210 is at rest, and therefore does not sound the horn 80. Furthermore, when an operator releases the mechanical parking brake by pressurizing the brake release line 74 and 76 via the valve 72 and trailer air supply 70, the alarm system 210 permits the brakes to release as described above in connection with the first alternative embodiment.

When the locking pins are disengaged, i.e. the lever 236 is reconfigured to the "unlocked pin" mode, the alarm system 210 attains an alarm mode. In this mode, the valve 220 is engaged to an exhaust configuration as explained above in connection with the first alternative embodiment. Consequently, the release valve 240 fails to establish a pressure equilibrium within it, and therefore, pressure within the primary brake line 223 is reduced, and air flows through the release valve 240 to sound the horn 80. Furthermore, due to the pressure drop in the primary brake line 223 and connecting line 77, the quick-release valve 73 in the brake valve 72 is also rendered out of equilibrium. Accordingly, air from the truck air supply 75 flows from the truck supply line 78, through the primary brake line 223, and through the air line 82 to further sound the horn 80. Also, the quick-release valve 73 simultaneously allows air to dump from the brake lines 74 and 76. Accordingly, pressure within these lines is insufficient to release the mechanical parking brakes. Notably, with the alarm system of this embodiment, the truck air supply sounds the alarm for the duration that the locking pins are unlocked. This can provide an added safety benefit if the application so requires.

VI. Third Alternative Embodiment

Figure 9:
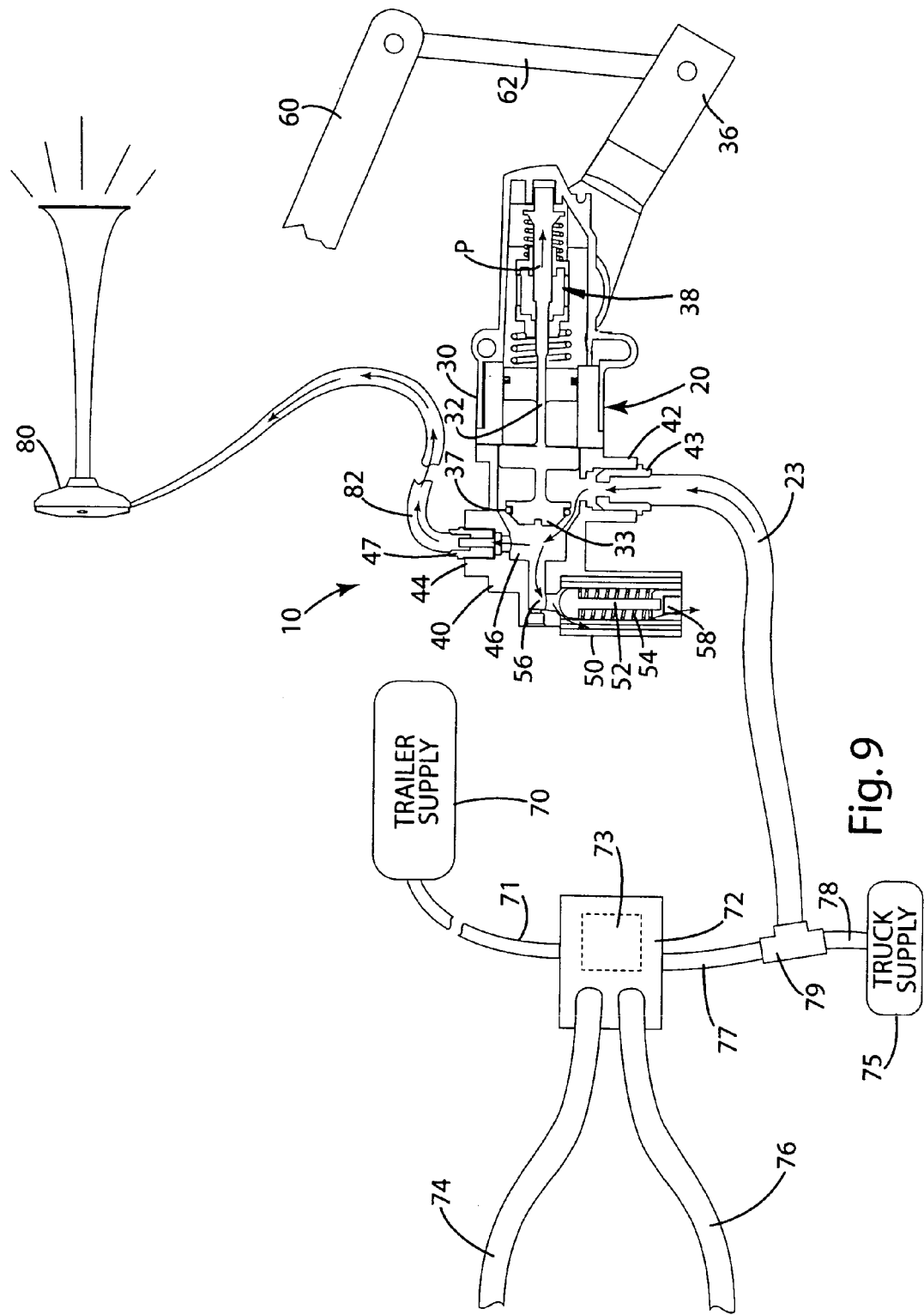
FIG. 9 is a third alternative embodiment of the sliding axle alarm system in an alarm mode.

A third alternative of the locking pin alarm system of the present invention is shown in FIG. 9 and generally designated 10. This alarm system is similar to the embodiment first described above. The primary differences between this third embodiment and that above are the connection of the truck air supply 75 to the system 10, and the incorporation of a quick-release valve 73 in the brake valve 72.

Specifically, the truck air supply 75 is in communication with the fitting 79 via truck air supply line 78. The primary brake line 23, brake line 77 and alarm valve 20 are also in communication with fitting 79. The quick-release valve 73 in this embodiment operates under the same principles as that described above in connection with the second alternative embodiment.

The system 10 operates in a rest mode and an alarm mode. When the system is in a rest mode, the plunger 33 seals against the inside of the chamber 46 so that air cannot be transferred from the primary brake line 23 through the alarm valve 20 to sound the horn 80. With the valve 20 configured in this rest mode, the quick-release valve 73 can attain equilibrium. This enables enough pressure to build in the brake release line 74 and 76 to release the mechanical parking brakes as desired.

In an alarm mode, which is shown in FIG. 9, the plunger is moved in direction P upon unlocking of the slider pins as described above. As a result, air from the truck air supply 75 is transferred via lines 78 and 23, through the alarm valve 20 to sound the horn 80 as described above. With the truck air supply being diverted in such a manner from the brake valve 72 in the alarm mode, the quick release valve 73 is no longer in equilibrium, and therefore, releases pressure from the brake lines 74 and 76 so that the mechanical parking brakes cannot be released. Notably, with the alarm system of this embodiment, the truck air supply sounds the alarm for the duration that the locking pins are unlocked. This can provide an added safety benefit if the application so requires.

VII. Fourth Alternative Embodiment

Figure 10:
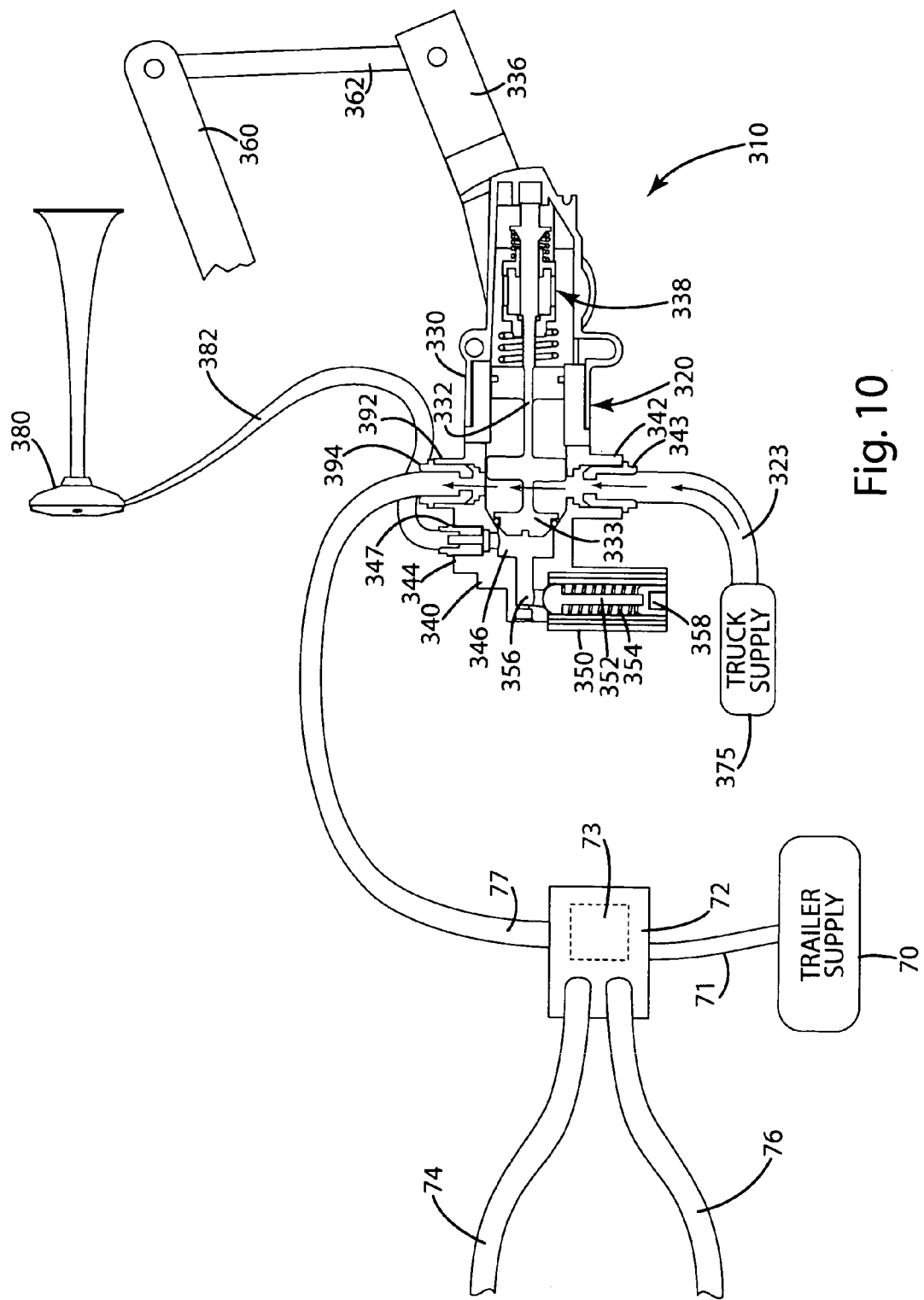
FIG. 10 is a fourth alternative embodiment of the sliding axle alarm system in a rest mode.
Figure 11:
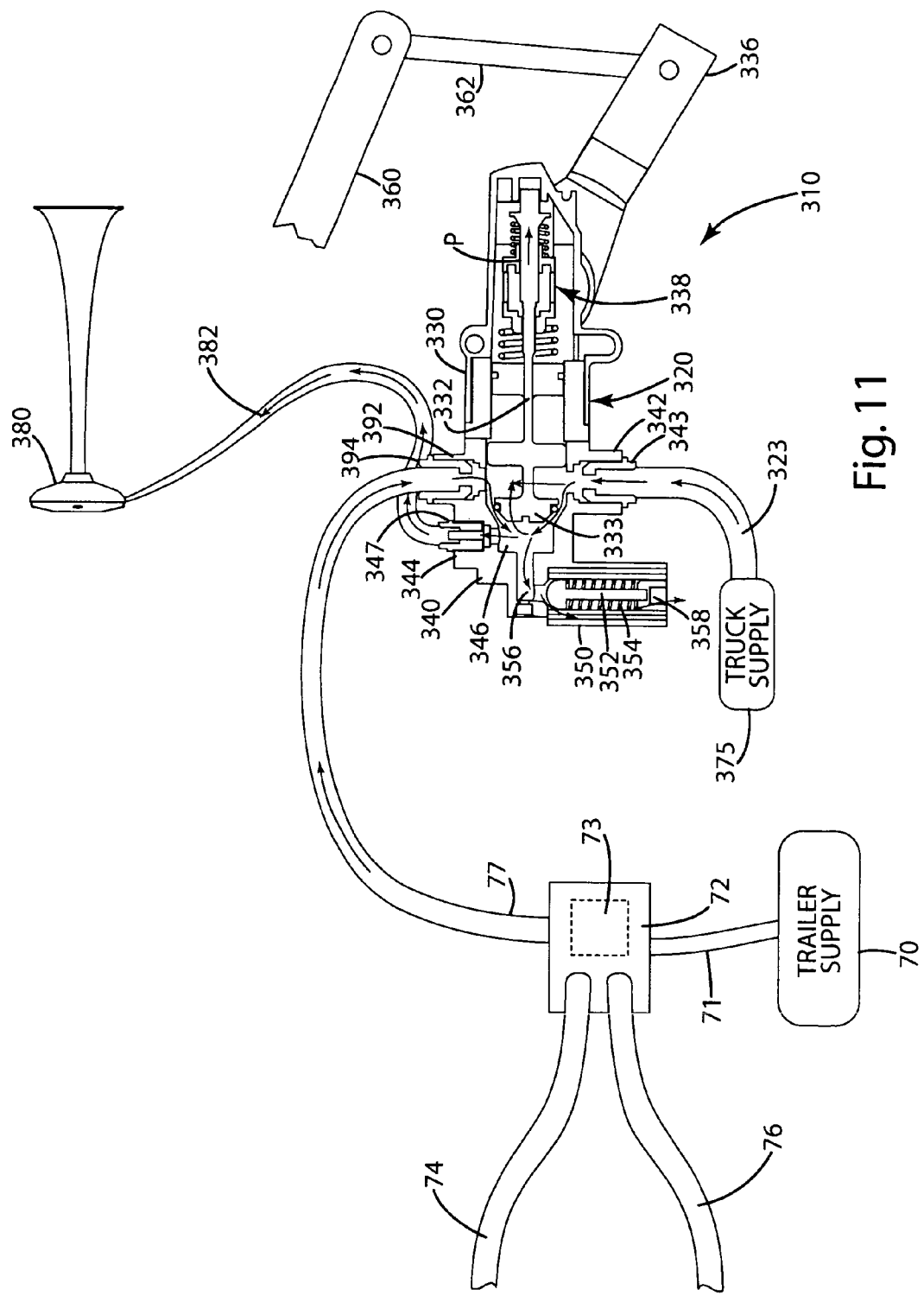
FIG. 11 is the fourth alternative embodiment of the sliding axle alarm system in an alarm mode.

A fourth alternative embodiment of the locking pin alarm system of the present invention is shown in FIGS. 10–11 and is generally designated 310. This system includes many of the same components of the embodiment shown in FIG. 6, which will not be re-described here. The system 310, however, includes a modified brake valve 72, a slightly different plumbing configuration, and an additional port 392.

In particular, the brake valve 72 includes a quick-release valve 73, which is in fluid communication with the trailer air supply 70, the brake lines 74 and 76 and the primary brake line 77. The quick-release valve operates so that if the pressure within the brake lines 74 and 76 are not in equilibrium with the pressure in line 77 and/or trailer supply line 71, air is vented from the brake lines 74 and 76 to the atmosphere. The valve 320 also includes an additional port 392 including fitting 394. The brake valve line 77 establishes fluid communication between with the brake valve 72 and the alarm valve 320 via this port 392. Additionally, the truck air supply 375 is in communication with the alarm valve 320 via air supply line 323. Finally, the audible alarm 380, i.e. the horn, is in fluid communication with the brake valve 320 via the alarm line 382, which is being connected to the alarm port 344.

The operation of the fourth alternative locking pin sliding axle alarm will now be described with reference to FIGS. 10–11. In general, the alarm system 310 performs the same function as the alarm system 10 described above. In FIG. 10, the sliding pins are properly engaged; therefore, the system is in a rest mode. Specifically, the lever 336 is positioned such that the plunger 333 seals against the interior of the chamber 346 so that air cannot be transferred to the alarm 380 to sound it. The truck air supply 375 is in fluid communication with the brake valve 72 in the direction shown with the arrows through the truck air supply line 323, the alarm valve 320 and the brake valve line 77. The pressure created by the air from the truck air supply establishes an equilibrium at the release valve 73. In this state of equilibrium, the release valve 73 does not allow pressure to be vented from the brake valve 72. Therefore, pressure from the trailer supply 70 can be transferred to and build in the brake release lines 74 and 76 to release the mechanical parking brakes as desired.

FIG. 11 illustrates the alarm system 310 operating in an alarm mode when an operator fails to properly engage the locking pins as discussed above. In this mode, the plunger 333 is moved in direction P so that it disengages the interior of the chamber 346. Accordingly, pressured air from the air truck supply 375 is vented through the line 323, the chamber 346 and out the alarm port 340 to the sound the audible alarm 380. A portion of this air may also be released via the pressure-relief valve 350. With air vented from the truck air supply 375 through the alarm rather than the brake line 77, the quick-release valve 73 within the brake valve 72 is no longer in equilibrium. Accordingly, the release valve 73 operates to dump air from the brake lines 74 and 76 in the direction of the arrows as shown through the brake line 77. This air also travels through the chamber 346 and out the alarm port 340 to assist in sounding the alarm 380. A portion of it may also escape from the alarm valve 320 via the pressure-relief valve 350 as described above. As a result of the alarm valve 320 venting air as described above, the pressure supplied to the brake-release line 74 and 76 is insufficient to release the parking brakes. To correct the problem (as with all the embodiments above), the driver may adjust the locking pins so that the alarm system 310 is reconfigured to the rest mode so that sufficient pressure can be established within the brake release lines 74 and 76. Notably, with the alarm system of this embodiment, the truck air supply sounds the alarm for the duration that the locking pins are unlocked while the brakes are being released. This can provide an added safety benefit if the application so requires.

VIII. Fifth Alternative Embodiment

Figure 12:
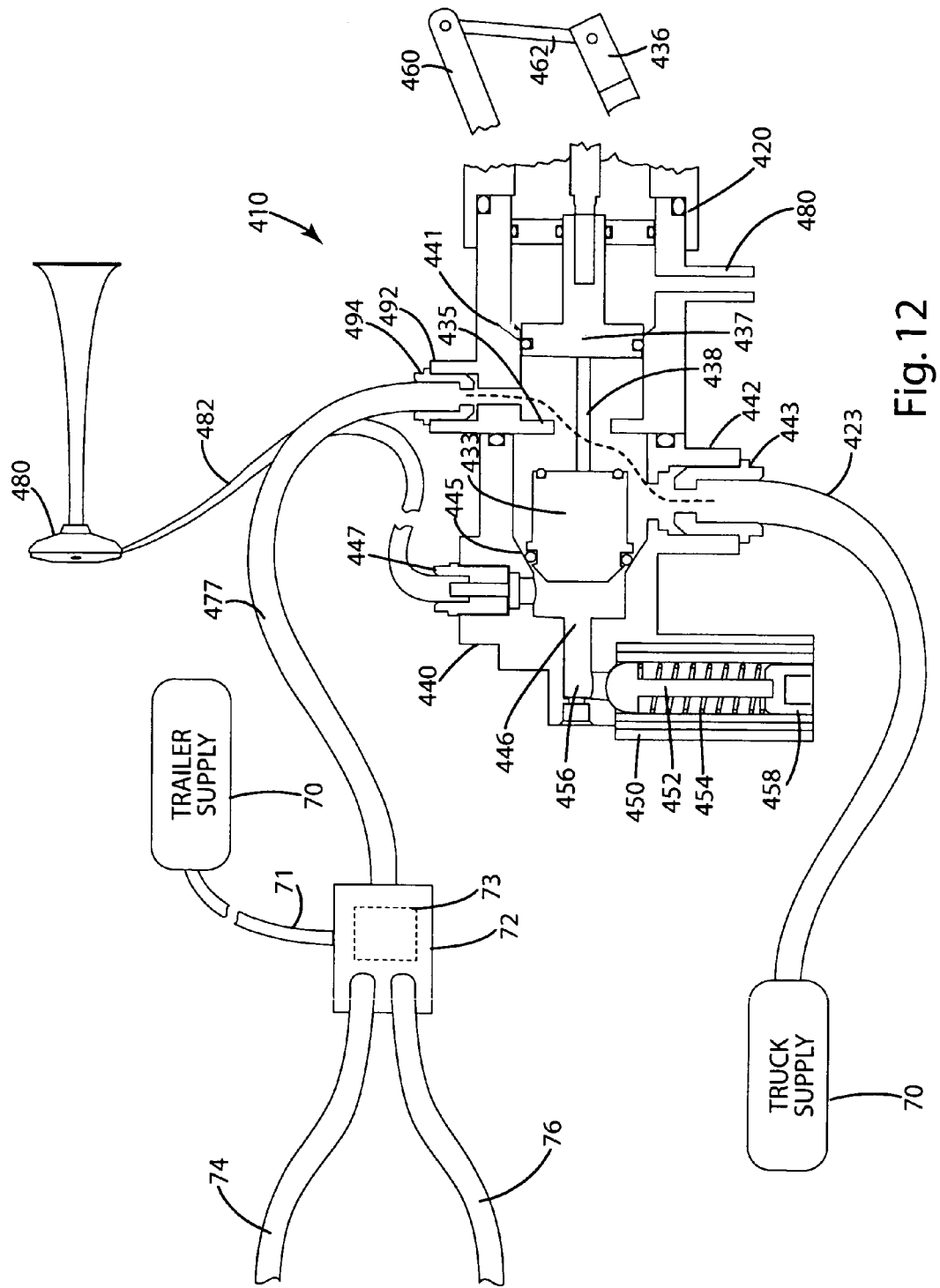
FIG. 12 is a fifth alternative embodiment of the sliding axle alarm system in a rest mode.
Figure 13:
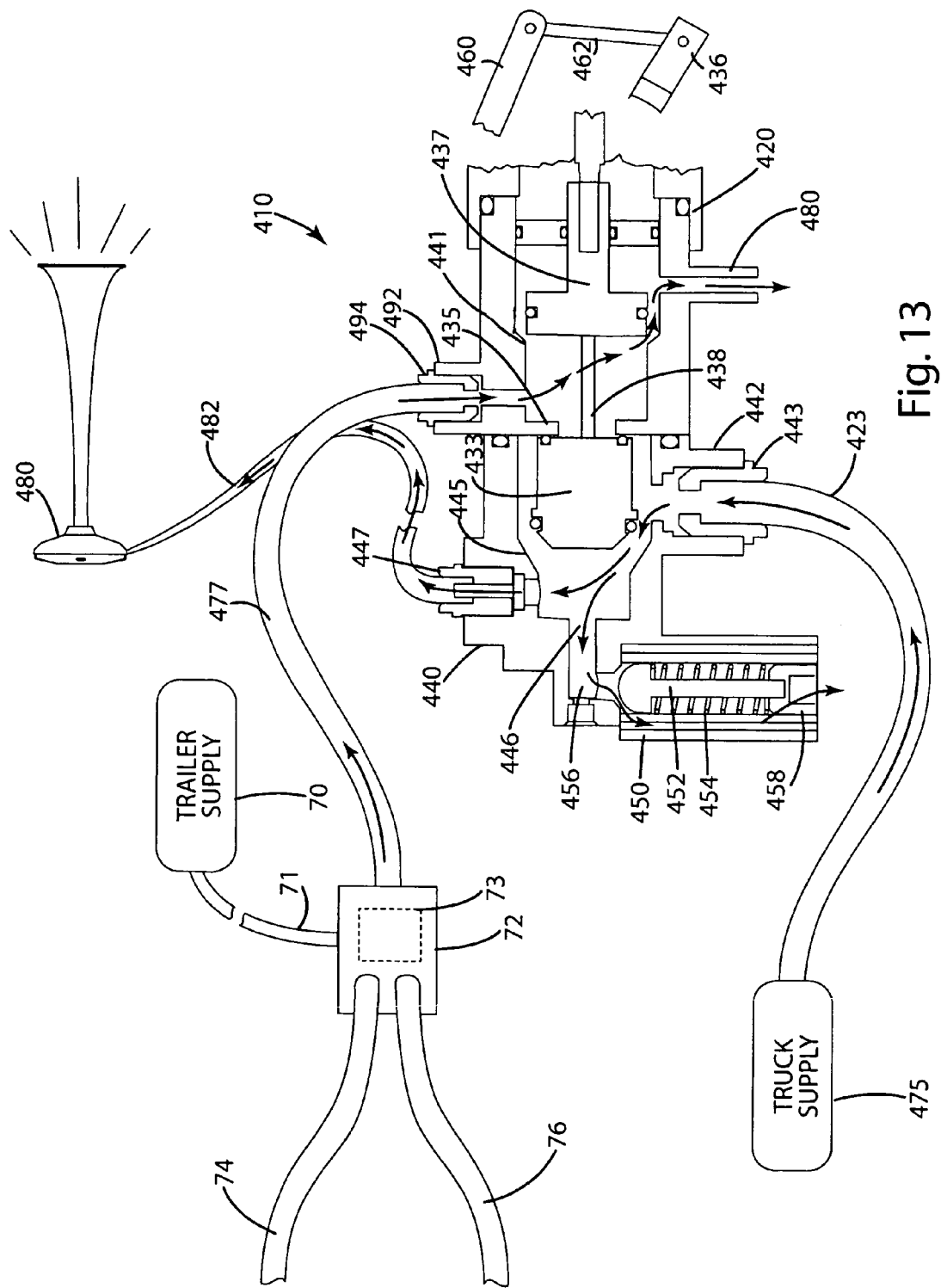
FIG. 13 is the fifth alternative embodiment of the sliding axle alarm system in an alarm mode.

A fifth alternative embodiment of the locking pin alarm system of the present invention is shown in FIGS. 12 and 13 and generally is designated 410. The system 410 is somewhat similar to the embodiments described above. Several differences, however, exist with regard to the features and plumbing of the alarm system 410. In particular, the alarm valve 420 includes brake port 492 having a brake port fitting 494. Brake line 477 is in fluid communication with the brake port 492 as well as the brake valve 72.

The alarm valve 420 also includes an alarm port 440 to which an alarm port fitting 447 is secured. The horn 480 is in fluid communication with the alarm port 440 via alarm line 482. A pressure-relief valve 450, which includes the same components as described above in connection with the first embodiment, can also be included in the alarm valve 420. An air supply port 442 including a fitting 443 is further in fluid communication with the alarm valve 420. More specifically, a truck air supply 475 is connected to this port 442 via truck air supply line 423. In addition, the alarm valve 420 further includes an exhaust port 480. The actuating mechanism of the alarm valve 420, i.e. the lever 436 and other components are the same as the above embodiments.

The internal components of the alarm valve 420 differ slightly from the first embodiment described above. Specifically, the alarm valve 420 defines interior chamber 446. Within this chamber, a plunger, including primary head 433 and a secondary head 437, is reciprocally disposed and actuated by the actuator mechanism 438. The primary plunger head 433 includes two sets of seals, one for engaging ramped surface 445, the other for sealing around an orifice defined by wall 435. The seals shown are depicted as O-rings, however other seals may be used as desired. The secondary plunger head 437 includes one set of seals which engages or does not engage the surface 441 on the interior of the alarm valve 420.

The operation of the fifth alternative locking pin sliding axle alarm 410 will now be described. The system in FIG. 12 is in a rest mode, i.e. the locking pins are properly engaged. In this configuration, the primary 433 and secondary 437 plungers of the alarm valve 420 are disposed in the chamber 446 as shown in FIG. 12. There, a seal is established between the primary plunger 433 and the ramped surface 445. Accordingly, the alarm 480 and the pressure-relief valve 450 are not in fluid communication with the truck air supply 475 or the brake valve 72. The secondary plunger head 437 engages the surface 441 so that the exhaust port 480 is not in fluid communication with the other ports of the valve. The truck air supply 475, however, remains in fluid communication with the brake valve 72 so that it maintains the release valve 73 in equilibrium. Accordingly, an operator can pressurize the brake lines 74 and 76 to release the mechanical parking brakes.

The alarm system 410 attains and operates in an alarm mode when operator fails to properly engage locking pins as discussed above. This alarm mode is illustrated in FIG. 13, where the lever 436 is actuated to reconfigure the primary 433 and secondary 437 plungers within the chamber 446. Specifically, the primary plunger 433 is positioned so that it sealingly engages the chamber wall 435 and provides fluid communication between the truck air supply 475 and the alarm port 440. Subsequently, air travels in the direction of the arrows from the truck air supply 475 to the horn 480 to sound the horn. A portion of the truck air supply air can be diverted through the pressure-relief valve 450 when that valve is included. The primary plunger 433 sealing against the chamber wall 435 prevents fluid communication between the truck air supply 475 and the brake valve 72, as well as the exhaust port 480. With the truck air supply 475 no longer pressurizing the release valve 73 in the brake valve 72, the release valve is no longer in equilibrium. Air is diverted from the brake lines 74 and 76, as shown with the arrows, past the secondary plunger 437, which is disengaged from the surface 441 of the chamber, and out the exhaust port 480. Accordingly, the mechanical parking brakes cannot be deactivated via the pressurized air in the brake lines 74 and 76 until the locking pins are re-engaged and the alarm system 410 reconfigured as shown in FIG. 12. Notably, with the alarm system of this embodiment, the truck air supply sounds the alarm for the duration that the locking pins are unlocked while the brakes are being released. This can provide an added safety benefit if the application so requires.

The above descriptions are those of the preferred embodiments of the invention. Various alterations and changes can be made without departing from the spirit and broader aspects of the invention as defined in the appended claims, which are to be interpreted in accordance with the principles of patent law including the doctrine of equivalents. Any references to claim elements in the singular, for example, using the articles "a," "an," "the," or "said," is not to be construed as limiting the element to the singular.

The embodiments of the invention in which an exclusive property or privilege is claimed are defined as follows:

1. A locking pin alarm system for a sliding axle assembly of a vehicle comprising:
   a locking pin adapted to engage and disengage a component of the vehicle;
   a horn;
   a selectively pressurized spring brake valve in fluid communication with a mechanical parking brake of the vehicle;
   an air supply; and
   an alarm valve mechanically coupled to the locking pin, the alarm valve in fluid communication with the horn, the spring brake valve, and the air supply, the alarm valve actuatable to:
   a rest mode when the locking pins engage the component of the vehicle, wherein the alarm valve permits the brake of the vehicle to be pressurized in the rest mode, and
   an alarm mode when the locking pins disengage the component of the vehicle, wherein the alarm valve vents air from at least one of the spring brake valve and the air supply, thereby preventing the brake of the vehicle from being fully pressurized in the alarm mode, wherein the alarm valve diverts the vented air from at least one of the spring brake valve and the air supply to the horn so that the diverted air blows the horn in the alarm mode, whereby an operator of the vehicle is informed that the locking pins are disengaged from the component by the sounding of the horn.

2. The locking pin alarm system of claim 1 wherein the alarm valve includes an arm mechanically coupled to the locking pin, the arm actuating the alarm valve to the rest mode and the alarm mode when the pins are engaged and disengaged from the component, respectively.

3. The locking pin alarm system of claim 2 wherein the alarm valve includes an exhaust port and a plunger actuated by the arm, the plunger sealingly engaging the exhaust port when the pins are engaged and not sealingly engaging the exhaust port then the pins are disengaged.

4. The locking pin alarm system of claim 3 wherein the alarm valve includes a horn port in fluid communication with the horn, and a pressure relief valve adapted to exhaust air to the atmosphere.

5. The locking pin alarm system of claim 4 wherein the exhaust port is in fluid communication with the horn port and the pressure relief valve.

6. The locking pin alarm system of claim 1 comprising a pressure relief valve in fluid communication with the alarm valve.

7. The locking pin alarm system of claim 6 wherein the relief valve vents air from the spring brake valve to the atmosphere so that pressure is prevented from increasing in the spring brake valve and subsequently releasing the mechanical parking brake of the vehicle.

8. A locking pin alarm system for a sliding axle assembly of a vehicle, the assembly including a pin mechanism operable between a locked mode and an unlocked mode, comprising:
an alarm;
an alarm valve including an actuator mechanically coupled to the pin mechanism, a brake port in fluid communication with brakes of the vehicle, and an alarm port in fluid communication with the alarm;
wherein the actuator configures the alarm valve in an alarm mode when the pin mechanism is in the unlocked mode;
wherein the alarm valve vents air from the brakes of the vehicle, through the brake port and the alarm port in the alarm mode; and
wherein the alarm is actuated by the air vented through the alarm port, whereby an operator of the vehicle is informed that the pin mechanism is in the unlocked mode.

9. The locking pin alarm system of claim 8 comprising a pressure relief valve in fluid communication with the alarm valve.

10. The locking pin alarm system of claim 9 wherein the alarm valve vents air from a brake of the vehicle through the pressure relief valve in the alarm mode.

11. The locking pin alarm system of claim 10 wherein the pressure relief valve relieves an amount of air sufficient to prevent the brake from releasing in the alarm mode.

12. The locking pin alarm system of claim 8 wherein the actuator is an arm mechanically coupled to a torque tube of the pin mechanism.

13. The locking pin alarm system of claim 8 comprising a release valve disposed in fluid communication with the alarm port and the brake port of the alarm valve, a brake of the vehicle and the alarm.

14. The locking pin alarm system of claim 13 wherein the release valve diverts air to the alarm from the alarm port when the alarm valve is in the alarm mode.

15. The locking pin alarm system of claim 14 wherein the release valve is in communication with a pressure relief valve to relieve a sufficient amount of air to prevent the brake from releasing when the alarm valve is in the alarm mode.

16. The locking pin alarm system of claim 8 wherein the alarm is an audible alarm.

17. The locking pin alarm system of claim 8 wherein the alarm is an air horn that sounds when the air vented through the alarm port blows through the air horn.

18. A locking pin alarm system for a sliding axle assembly of a vehicle, the vehicle having a parking brake and an air supply, the assembly including a locking pin adapted to be locked and unlocked, comprising:
an audible alarm; and
an alarm valve mechanically coupled to the locking pin, the alarm valve in fluid communication with the audible alarm, the alarm valve configured in a first mode when the locking pin is locked, and in a second mode when the locking pin is unlocked, wherein the alarm valve diverts air from at least one of an air supply and a parking brake of the vehicle to sound the audible alarm with the diverted air when the alarm valve is in the second mode, and wherein the alarm valve permits the parking brake of the vehicle to be released when the alarm valve is in the first mode.

19. The locking pin alarm system of claim 18 comprising a relief valve in fluid communication with the alarm valve, the relief valve releasing to the atmosphere an amount of diverted air sufficient to prevent the parking brake from releasing in the second mode.

20. The locking pin alarm system of claim 18 wherein the audible alarm is an air horn.

21. The locking pin alarm system of claim 18 wherein the alarm valve includes an exhaust port which exhausts air from the parking brake in the second mode.

22. The locking pin alarm system of claim 18 comprising an alarm port, a truck air supply port, and a brake port, all in fluid communication with a chamber defined by the alarm valve.

23. The locking pin alarm system of claim 22 comprising a plunger that establishes fluid communication between the alarm port and the truck air supply port and prevents fluid communication between the truck air supply and the brake port in the second mode.

24. The locking pin alarm system of claim 22, wherein the plunger establishes fluid communication between the truck air supply and the brake port in the first mode.

* * * * *